United States Patent
Liu

(10) Patent No.: US 9,235,297 B2
(45) Date of Paten: Jan. 12, 2016

(54) CAPACITIVE SENSING APPARATUS AND METHOD APPLIED TO TOUCH SCREEN USING THE CAPACITIVE SENSING APPARATUS

(75) Inventor: Chi Kang Liu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 1048 days.

(21) Appl. No.: 12/874,273

(22) Filed: Sep. 2, 2010

(65) Prior Publication Data
US 2011/0074728 A1 Mar. 31, 2011

(30) Foreign Application Priority Data
Sep. 29, 2009 (TW) ............................. 98133019 A

(51) Int. Cl.
*G06F 3/044* (2006.01)
*G06F 3/041* (2006.01)
*G02F 1/1333* (2006.01)
*G09G 3/36* (2006.01)

(52) U.S. Cl.
CPC .............. *G06F 3/044* (2013.01); *G06F 3/0412* (2013.01); *G09G 3/3655* (2013.01); *G02F 1/13338* (2013.01)

(58) Field of Classification Search
CPC . G09G 3/3614; G09G 3/3648; G09G 3/3655; G09G 2300/0426; G06F 3/044; G06F 3/0412; G06F 3/0416; G06F 3/0418; G02F 1/13338
See application file for complete search history.

(56) References Cited

U.S. PATENT DOCUMENTS

| | | | | |
|---|---|---|---|---|
| 2006/0201931 | A1* | 9/2006 | Lee et al. | 219/497 |
| 2007/0262966 | A1* | 11/2007 | Nishimura | G06F 3/044 345/173 |
| 2009/0243817 | A1* | 10/2009 | Son | 340/407.2 |
| 2011/0187677 | A1* | 8/2011 | Hotelling et al. | 345/174 |

FOREIGN PATENT DOCUMENTS

| | | | | |
|---|---|---|---|---|
| CN | 101968581 A | | 2/2011 | |
| WO | WO 98/28731 A2 * | | 7/1998 | G09G 3/00 |

OTHER PUBLICATIONS

Chinese Office Action dated Mar. 31, 2012, 4 pages.

* cited by examiner

*Primary Examiner* — Nalini Mummalaneni
(74) *Attorney, Agent, or Firm* — Edell, Shapiro & Finnan, LLC

(57) ABSTRACT

A capacitive touch screen sensing apparatus is provided. The apparatus includes a protecting layer; a sensing layer under the protecting layer for sensing a touch to generate a position signal; and a DC common voltage signal layer electrically connected with a DC voltage for shielding against signal interferences.

7 Claims, 11 Drawing Sheets

CAPACITIVE SENSING APPARATUS AND METHOD APPLIED TO TOUCH SCREEN USING THE CAPACITIVE SENSING APPARATUS

CROSS REFERENCE TO RELATED PATENT APPLICATION

This patent application is based on Taiwan, R.O.C. patent application No. 098133019 filed on Sep. 29, 2009.

FIELD OF THE INVENTION

The present invention relates to a touch sensing apparatus and method, and more particularly to a touch sensing apparatus and method applied to a capacitive touch screen.

BACKGROUND OF THE INVENTION

FIG. 1 is a conventional touch screen. The touch screen comprises a display controller 130, a touch panel 150, a sensing circuit 155 and a liquid crystal display (LCD) panel 170. In general, the touch panel 150 is fabricated on the LCD panel 170. The display controller 130 receives a video signal and converts the video signal to a panel control signal transmitted to the LCD panel 170 so that the LCD panel 170 displays the image according to the panel control signal. When one touches the touch panel 150, the touch panel 150 generates a sensing signal to the sensing circuit 155, and the sensing circuit 155 outputs according to the sensing signal a position signal that represents a touch point where one touches the touch panel 150.

FIG. 2A is a diagram of the LCD panel. The LCD panel 170 is generally divided into two regions—a display region 112 and a non-display region 114. The display region 112 comprises a thin film transistor (TFT) array, and the non-display region 114 comprises a gate driver 120 and a source driver 125 for controlling transistors in the TFT array. The panel control signal outputted from the display controller 130 controls the gate driver 120 to generate a gate driving signal and the source driver 125 to generate a source driving signal. The panel control signal further comprises a common voltage signal Vcom for controlling the inversion of a liquid crystal on the LCD panel 170. The gate driving signal controls respective TFTs within the TFT array to whether turn on or turn off, and the source driving signal provides brightness data to a pixel. In FIG. 2A, in a portable electronic device application, the display controller 130 can be integrated with a timing controller (TCON), the gate driver 120 and the source driver 125.

The video signal comprises a vertical synchronization signal Vsync, a horizontal synchronization signal Hsync, a red signal, a green signal and a blue signal. The time to display a scan line on the LCD panel 170 is a period of the horizontal synchronization signal Hsync, while the time to display a frame on the LCD panel 170 is a period of the vertical synchronization signal Vsync. That is, if the LCD panel 170 has M scan lines, the gate driver 120 can generate M gate driving signals, and one period of the vertical synchronization signal Vsync equals M periods of the horizontal synchronization signal Hsync. According to the horizontal synchronization signal Hsync, M gate driving signals can be turned on sequentially.

FIG. 2B is a diagram of the vertical synchronization signal Vsync, the horizontal synchronization signal Hsync, the common voltage signal Vcom and the gate driving signals. The period of the vertical synchronization signal Vsync begins from the start of the low level, and one period of the vertical synchronization signal Vsync equals a plurality of periods of the horizontal synchronization signal Hsync. According to the horizontal synchronization signal Hsync, a plurality of gate driving signals can be turned on sequentially, and a frequency of the common voltage signal Vcom is a half of a frequency of the horizontal synchronization signal Hsync. As mentioned, in the portable electronic device application, the display controller 130 can be integrated with the timing controller, the gate driver 120 and the source driver 125, with the common voltage signal Vcom being present in the integrated display controller 130.

During a vertical blanking interval (VBI), the red signal, the green signal and the blue signal do not output any data, while the common voltage signal Vcom also remains at the low level.

FIG. 3 is a diagram of a conventional capacitive touch panel. The capacitive touch panel comprises a first sensing layer 151, a second sensing layer 152 and a shielding layer 153. Generally, the first sensing layer 151 and the second sensing layer 152 respectively comprise a plurality of sensing components, each of which can be viewed as a capacitor.

When one touches the capacitive touch panel, an equivalent capacitance of the touch point is changed. By detecting the change in the equivalent capacitance of the touch point, the sensing circuit 155 can detect the actual position of the touch point and output a corresponding position signal. The shielding layer 153 is mainly for isolating the panel control signal from the sensing signal so that the sensing signal is not undesirably affected by noises from the panel control signal.

FIG. 4 is a diagram of a conventional capacitive touch sensing apparatus 40. The apparatus 40 comprises a protecting layer 420, a touch panel 450, a sensing protection layer 457 and a Vcom signal layer 480. The protecting layer 420 protects the capacitive touch sensing apparatus 40 from scratches that may be caused by touching. The sensing protection layer 457 protects the touch panel 450. The touch panel 450 comprises a first sensing layer 451, a second sensing layer 452 and a shielding layer 453. Generally, the first sensing layer 451 and the second sensing layer 452 comprise a plurality of sensing elements, and each sensing element can be viewed as a capacitor. Since sensing elements of the sensing layers 451 and 452 are usually capacitors, the touch panel 450 is additionally provided with the sensing protection layer 457 for protecting the touch panel 450 from deformation.

When one touches the capacitive touch panel, an equivalent capacitance of the touch point is changed. Hence, the capacitive touch sensing apparatus 40 can use such characteristic to detect the actual position of the touch point and output the position signal. Since signals in the conventional Vcom signal layer 480 are alternating current (AC) signals that are constantly transitive, significant noise interference imparted to the touch panel 450. To render shielding effects against the noise interferences, the shielding layer 453 is provided to isolate the Vcom signal layer 480 and the touch panel 450 from each other. However, helpful to reduce noise interference, the shielding layer 453 increases the manufacturing cost and also reduces transmittance of the touch panel 450. Further, during the manufacturing process of the touch panel 450, the shielding layer 453 needs to be adhered with the second sensing layer 452 and the sensing protection layer 457, and so the manufacturing cost increases from having to discard the entire touch panel 450 in the event of an adherence failure. Further still, due to the additionally provided shielding layer 453, the touch panel 450 includes not three layers but four layers, which compromises the transmittance of the capacitive touch sensing apparatus 40.

FIG. 5 is a diagram of the relation between a conventional source driving signal and a common voltage signal Vcom. The conventional touch sensing apparatus uses an AC Vcom signal. For example, the AC Vcom signal swings from −1V to 4V, and then a source swing of the source driving signal need an inversion signal of −1V to 4V to provide a voltage difference of 5V between the source driving signal and the AC Vcom signal; that is, the source driving signal provides a working voltage range of 5V.

To accommodate the AC Vcom signal adopted in the conventional touch sensing apparatus, the four-layered capacitive touch sensing apparatus is needed. As discussed above, the conventional four-layered capacitive touch sensing apparatus is not only costly but also has unsatisfactory transmittance. Therefore, there is a need for a capacitive touch sensing apparatus that overcomes the above shortcomings.

SUMMARY OF THE INVENTION

It is one of the objectives of the present invention to provide a capacitive touch sensing apparatus and method applied on a touch screen, so that a capacitive touch panel of the touch screen does not need a shielding layer and can output a position signal correctly.

The invention provides a capacitive touch sensing apparatus comprising: a protecting layer; a sensing layer deployed under the protecting layer for sensing a touch to generate a position signal; and a DC common voltage signal layer electrically connected with a DC voltage for shielding against signal interference.

The invention further provides a capacitive touch sensing method comprising: applying a DC common voltage signal to a common voltage signal layer on a small-sized panel of a portable device; generating a driving signal symmetrical to the common voltage signal layer for driving a driver; and sensing a touch to output a position signal.

The invention further provides a touch screen comprising: an LCD panel; a touch panel for generating a sensing signal in response to a touch; a display controller for processing an image signal to generate a panel control signal comprising a fixed common voltage; and a sensing circuit coupled to the touch panel for receiving the sensing signal to generate a position signal.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

Figure 1:
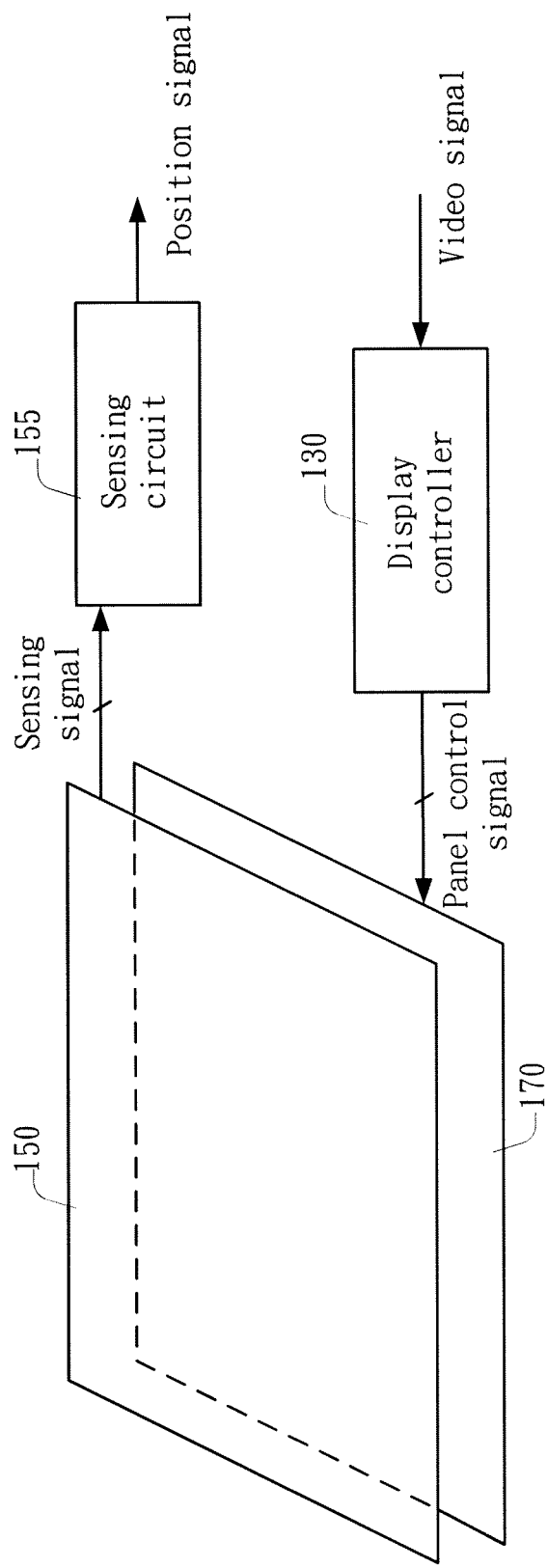
FIG. 1 is a conventional touch screen.
Figure 2A:
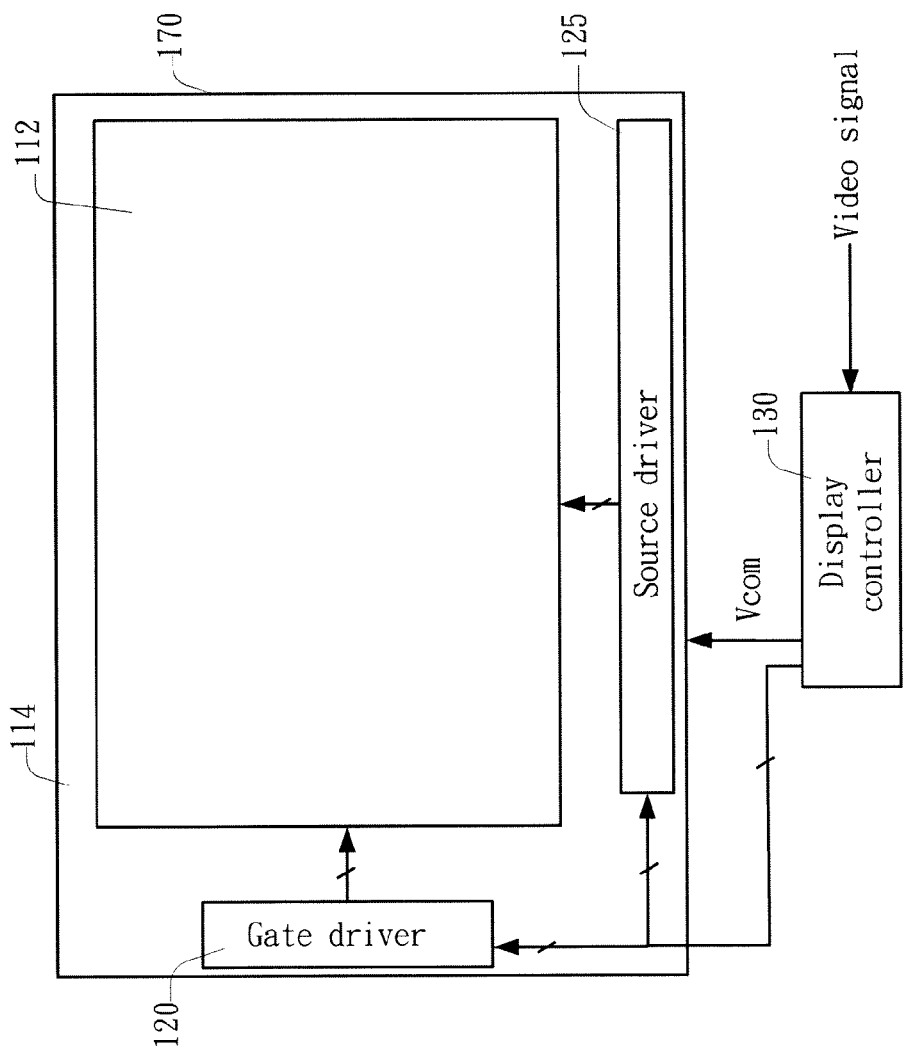
FIG. 2A is a diagram of an LCD panel.
Figure 2B:
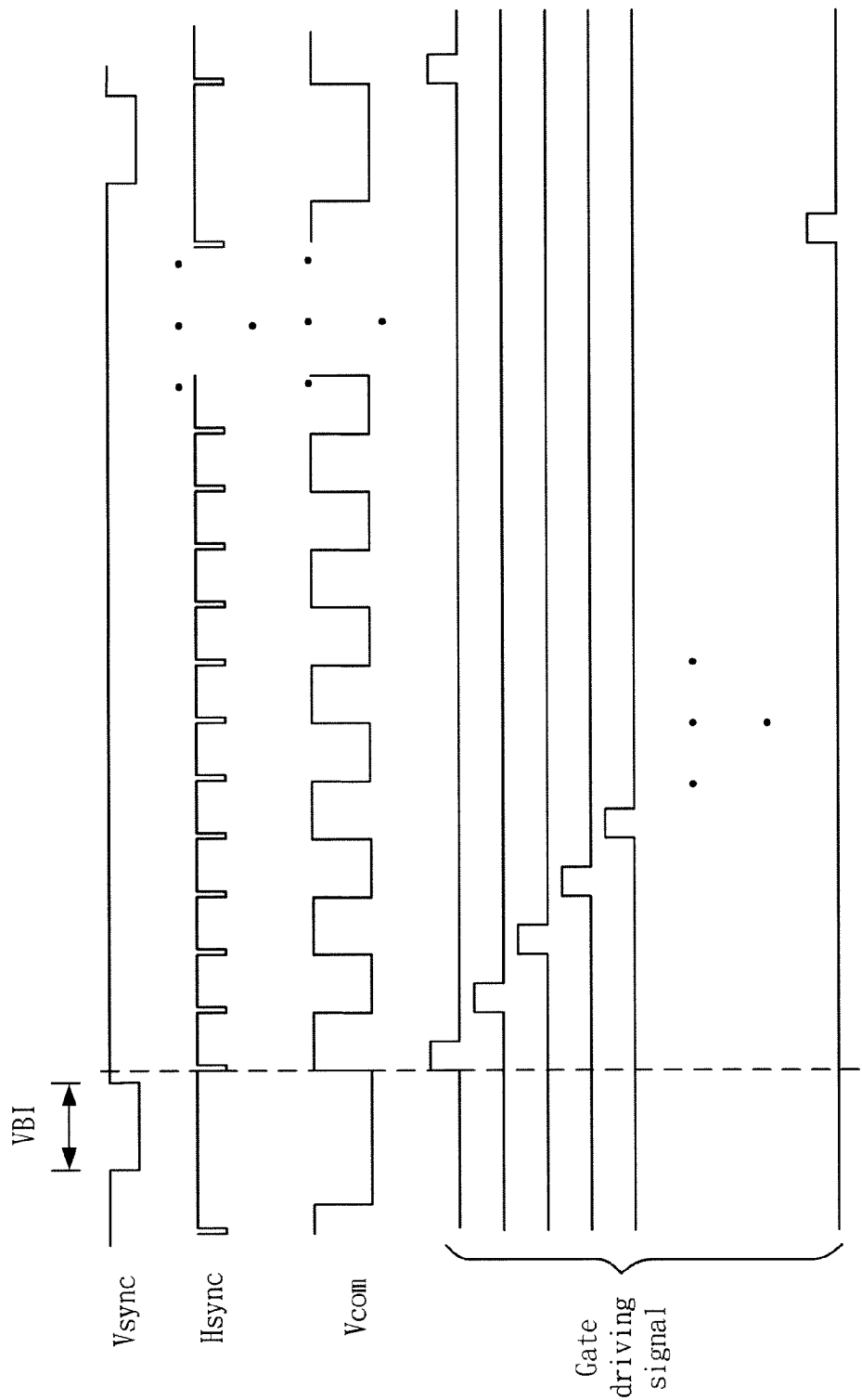
FIG. 2B is a diagram of a vertical synchronization signal Vsync, a horizontal synchronization signal Hsync, a common voltage signal Vcom and gate driving signals.
Figure 3:
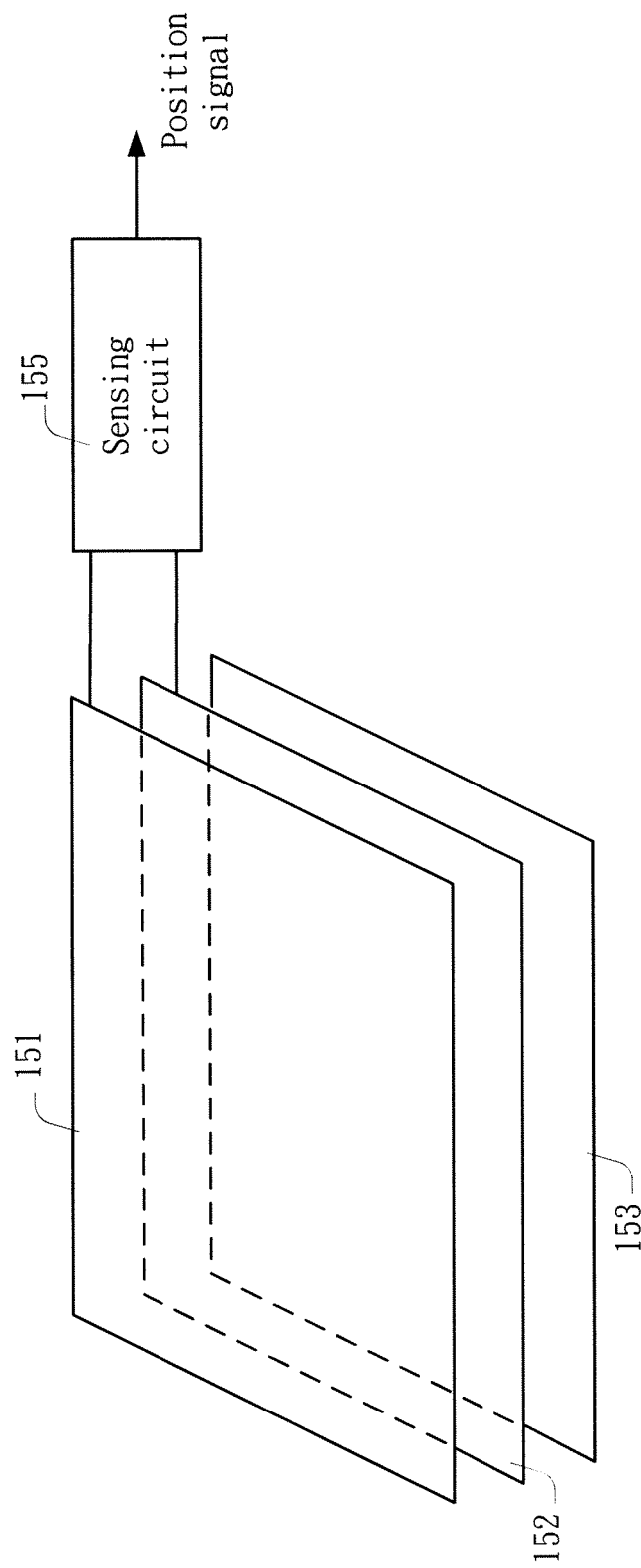
FIG. 3 is a diagram of a conventional capacitive touch panel.
Figure 4:
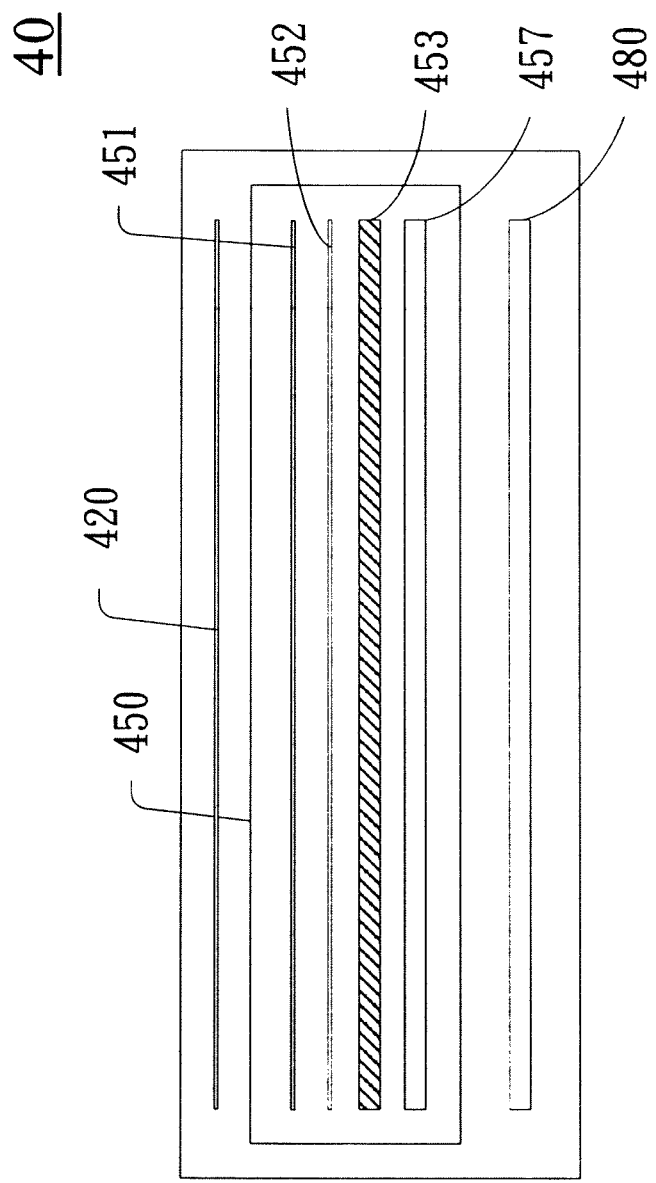
FIG. 4 is a diagram of a conventional capacitive touch sensing apparatus.
Figure 5:
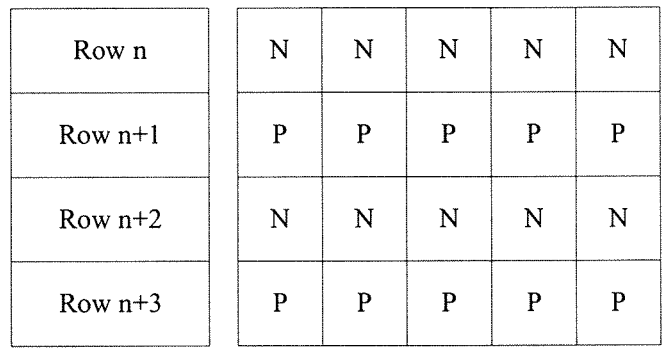
FIG. 5 is a diagram of the relation between a conventional source driving signal and a common voltage signal.
Figure 5:
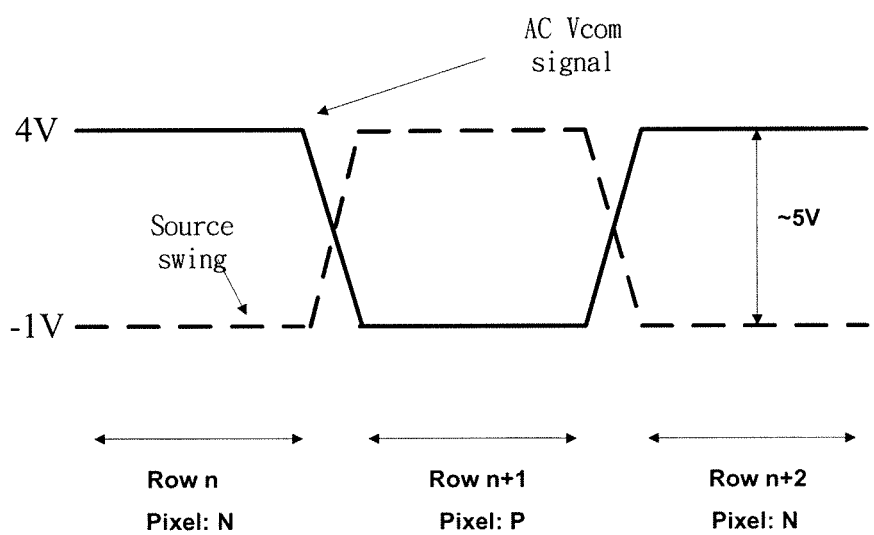
Figure 6:
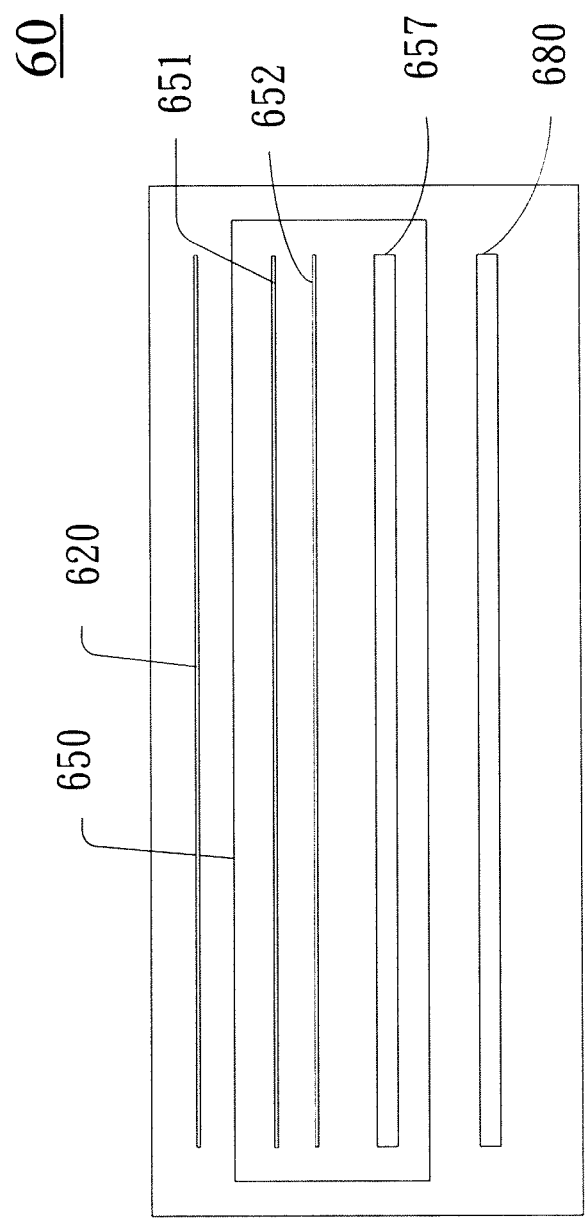
FIG. 6 is a capacitive touch sensing apparatus according to one embodiment of the present invention.

FIG. 6 is a capacitive touch sensing apparatus 60 according to one embodiment of the present invention. The apparatus comprises a protecting layer 620, a touch panel 650 and a common voltage (Vcom) signal layer 680. The touch panel 650 comprises a first sensing layer 651, a second sensing layer 652 and a sensing protection layer 657. The protecting layer 620 protects the capacitive touch sensing apparatus 60 from scratches that may be caused by touching. The sensing protection layer 657 protects the touch panel 650. Since sensing elements of the sensing layers 651 and 652 are both capacitive soft boards (i.e., flexible members), the sensing protection layer 657 is added to protect the touch panel 650 from deformation. Alternatively, the touch panel 650 is directly adhered to the Vcom signal layer 680 without the sensing protection layer 657. The protecting layer 620 and the sensing protection layer 657 are often made of hardened compounds, such as silicon dioxide or glass. The sensing layers 651 and 652 are made of compounds of good conductivity and high transparency, such as indium-tin oxide (ITO) shielding.

Figure 7:
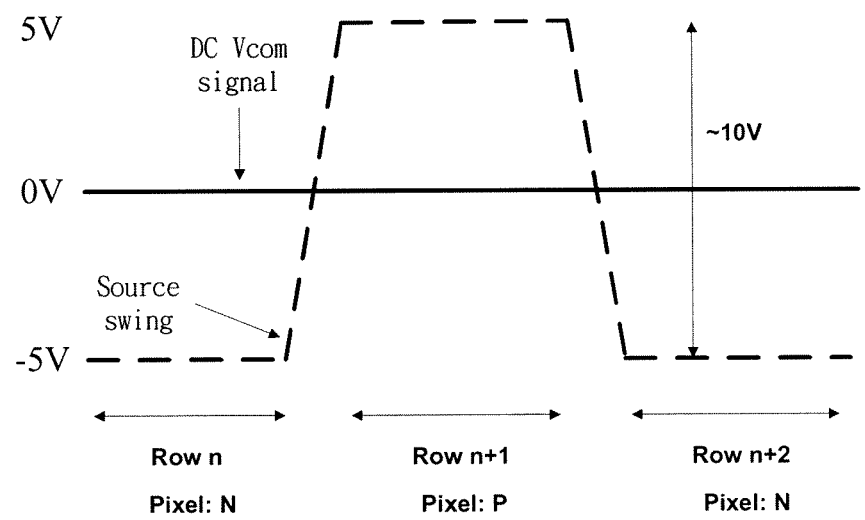
FIG. 7 is a diagram of the relation between a source driving signal and a common voltage signal according to one embodiment of the present invention.

FIG. 7 is a diagram of the relation between a source driving signal and a Vcom signal according to one embodiment of the present invention. By realizing the application of a fixed Vcom signal to a small-sized panel, power consumption for driving the Vcom signal can be reduced, which is a significant breakthrough in power saving on portable products. In this embodiment, the fixed voltage (e.g., 0 Volt (0V) to −2V, taking 0V for example in FIG. 7) is provided by a direct current (DC) Vcom signal. An effective voltage difference between the source driving signal and the DC Vcom signal is 5V, and a source displacement can be −5V to 5V. That is, if the source driving signal provides a 10V of working voltage range, then the effective voltage difference between the source driving signal and the DC Vcom signal is also 5V. In this embodiment, the working voltage 10V can be realized by two deep N-wells (DNW) of N-well (NW) and P-well (PW) with a voltage difference of 5V.

It is to be noted that, liquid crystal molecules have a characteristic that they cannot be maintained at a constant voltage level for a long time, or else such molecules will be destroyed. In this case, destroyed liquid crystal molecules cannot rotate in response to an electric field to form different gray scales when the voltage is changed. Preferably, the voltage is recovered at a particular interval to prevent the liquid crystal molecules from being impaired. However, if the screen persistently displays the same gray scale while the voltage level cannot remain the same, liquid crystal molecules in a liquid crystal display (LCD) are divided into two polarities, i.e., a positive (P) polarity and a negative (N) polarity. A liquid crystal molecule is positive when the source driving voltage is higher than the Vcom signal, and is negative when the source driving voltage is lower than the Vcom signal. Regardless of the polarity being positive or negative, a gray scale with the same brightness is generated when the displacements from the Vcom signal are the same. That is, a same displacement between the source driving voltage and the Vcom signal renders a same grey scale regardless of which voltage being higher or lower than the Vcom signal. The directions of the liquid crystal molecule are opposite when the polarities are opposite, so it resolves the previous problem of damage to liquid crystal molecules when a constant voltage level is applied for a long period on liquid crystal molecules where the molecules are fixed at a same direction. That is to say, when a currently displayed image stays unchanged, by alternating the voltage level of the liquid crystal molecules, the polarity (i.e., positive and negative) of the liquid crystal molecules are constantly altered with the directions of the liquid crystal molecules continuously changed, so as to preserve the above characteristic of liquid crystal molecules while also keeping the currently displayed image appear as being still.

There are five methods applied to changing polarity of an LCD panel: frame inversion, row inversion, column inversion, dot inversion and delta inversion. The polarity can be changed when updating data of a next frame. For example, a 60 Hz refresh frequency means changing the polarity of the image every 16 ms. That is, the polarity of a same point is changed continuously. Further, whether two neighboring points have the same polarity is dependent on the method of changing polarity—with the frame inversion, all points of a whole image have the same polarity; with the column inversion and the row inversion, points on neighboring columns or rows respectively have opposite polarities; with the dot inversion, upper, lower, left and right points adjacent to a particular point have an opposite polarity from the particular point; and with the delta inversion in which a unit of a pixel is formed by three RGB points, and the polarities are similar to those in the dot inversion, i.e., in a unit of a pixel, each pixel has an opposite polarity from pixels at its upper, lower, left and right positions.

Since the polarity change method of an LCD panel relates to the LCD performance, two important phenomena occurring in the LCD are introduced. The first is that crosstalk exists in the LCD, i.e., data of neighboring points on the LCD interfere with one another to result incorrectness in a displayed image. Although crosstalk is caused by many reasons, the phenomenon can be reduced if polarities of neighboring points are different. Hence, the dot inversion has its advantage of providing such characteristic. The other phenomenon is flicker, which means the image appears to flicker when one observes the image on the LCD. The flicker here is not an intended visual effect, but instead is an inevitable phenomenon that occurs when the pixels on the image are changed whenever the image is refreshed. Again, the dot inversion can also reduce this phenomenon.

However, it is noted that not all the polarity change methods can match the above two Vcom signals, i.e., the AC Vcom signal and the DC Vcom signal. When the DC Vcom signal is used, all the polarity change methods can be used. However, if the AC Vcom signal is used, the polarity change methods can only be the frame inversion or the row inversion. That is to say, if the column inversion or the dot inversion is needed, the DC Vcom signal should be used.

Figure 8:
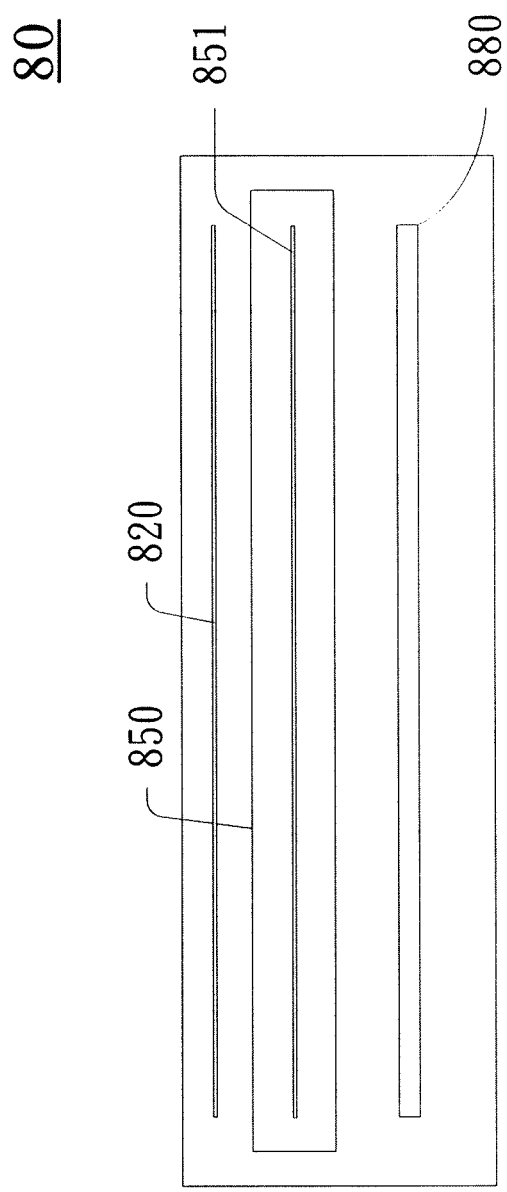
FIG. 8 is a capacitive touch sensing apparatus according to another embodiment of the present invention.

FIG. 8 is a capacitive touch sensing apparatus 80 according to another embodiment of the present invention. The apparatus 80 comprises a protecting layer 820, a touch panel 850 and a Vcom signal layer 880. The touch panel 850 comprises a sensing layer 851. FIG. 8 is similar to FIG. 6, and the differences are that the touch panel 650 in FIG. 6 has two sensing layers 651 and 652 but the touch panel 850 on FIG. 8 only has one sensing layer 851, and the touch panel 650 in FIG. 6 has the sensing protection layer 657 while the touch panel 850 on FIG. 8 is directly attached to the Vcom signal layer 880. Other operation details are similar to those in the foregoing description, and shall not be again described for brevity.

Figure 9:
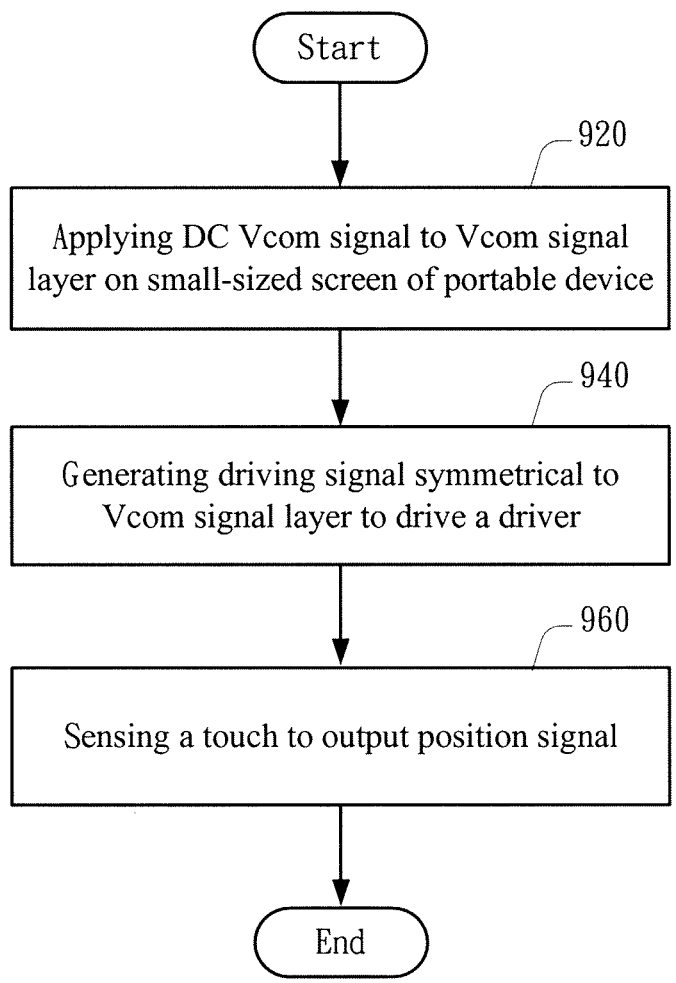
FIG. 9 is a flowchart of a capacitive touch sensing method according to one embodiment of the present invention.

FIG. 9 is a flowchart of a capacitive touch sensing method according to one embodiment of the present invention. In Step 920, a DC Vcom signal is applied to a Vcom signal layer of a small-sized screen on a portable device. Since the DC Vcom signal is at a constant DC voltage level, signal performance of the sensing layer is unaffected by the voltage displacement to provide good shielding effects for reducing signal interferences. In Step 940, a driving signal symmetric to the Vcom signal layer is generated to drive the driver. Preferably, the driving signal is generated by a plurality of deep N-wells formed by the voltage difference with 5V of N-wells and P-wells. In Step 960, a touch to output a position signal is sensed.

Figure 10:
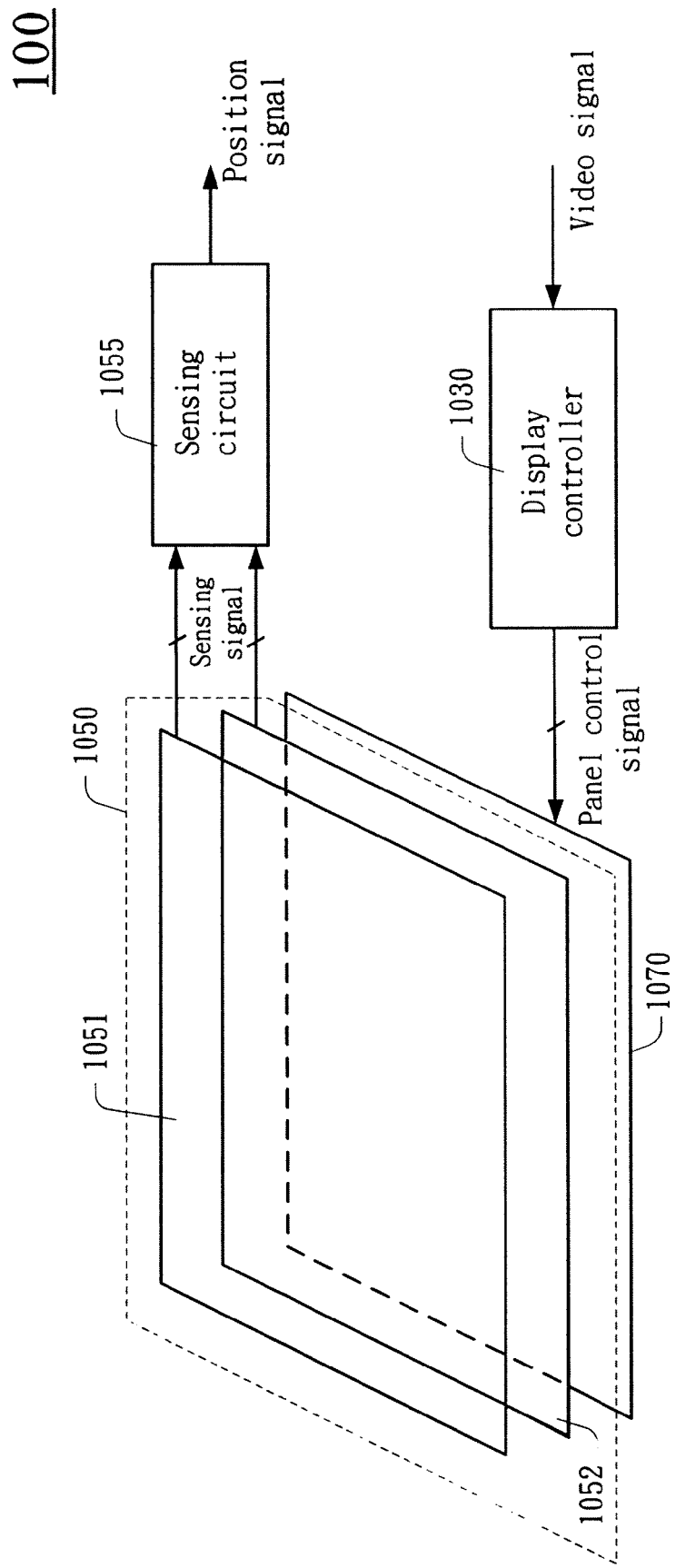
FIG. 10 is a touch screen according to one embodiment of the present invention.

FIG. 10 is a touch screen 100 according to one embodiment of the present invention. The touch screen 100 comprises a display controller 1030, a touch panel 1050, a sensing circuit 1055 and an LCD panel 1070. The touch panel 1050 comprises a first sensing layer 1051 and a second sensing layer 1052. The touch panel 1050 is disposed on the LCD panel 1070. The display controller 1030 receives an image signal and converts the image signal to a panel control signal to the LCD panel 1070, so that the LCD panel 1070 displays images according to the panel control signal. When one touches the touch panel 1050, the touch panel 1050 generates a sensing signal to the sensing circuit 1055. The sensing circuit 1055 can output according to the sensing signal a position signal that represents the touch point where one touches the touch panel 1050. The first sensing layer 1051 and the second sensing layer 1052 comprises a plurality of sensing components, and each component can be viewed as a capacitor.

The touch panel 1050 according to the present invention can eliminate the shielding layer needed in the prior art. According to the present invention, the panel control signal of the DC Vcom signal is applied by the LCD controller 1030 to the LCD panel 1070, so as to provide good shielding effects that prevent the panel control signal from coupling to the sensing signal. Hence, the present invention offers advantages of providing a capacitive touch panel on the touch screen without adopting the shielding layer in a way that the position signal is still sensed correctly as well as reducing the manufacturing cost and increasing the transmittance of the screen.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A capacitive touch sensing apparatus, comprising:
    a protecting layer;
    a sensing layer comprising a single layer, disposed under the protecting layer, for sensing a touch to generate a position signal;
    a direct-current (DC) common voltage signal layer electrically connected with a DC voltage for shielding against signal interference;
    a liquid crystal display (LCD) panel; and
    a display controller coupled to the DC common voltage signal layer for generating an alternating current source driving signal as part of a panel control signal while driving the LCD panel, wherein a source displacement of the source driving signal is symmetrical to the DC voltage, wherein the DC voltage of the panel control signal is applied by the display controller to the LCD panel during sensing of the touch to prevent the panel control signal from coupling to the position signal, wherein the DC voltage is a DC signal of 0 volts, wherein the capacitive touch sensing apparatus does not include a shielding layer disposed between the DC common voltage signal layer and the sensing layer and the DC common voltage signal layer is directly attached below the sensing layer, and wherein the LCD panel displays image data by dot inversion while driving the LCD panel.

2. The apparatus according to claim 1, wherein the sensing layer comprises a plurality of capacitors.

3. The apparatus according to claim 1, wherein the sensing layer comprises an indium-tin oxide (ITO) layer.

4. The apparatus according to claim 1, wherein the protecting layer is made of glass.

5. A capacitive touch sensing method, comprising:

applying, from a display controller, a DC common voltage signal to a DC common voltage signal layer on a small-sized liquid crystal display (LCD) panel of a portable device;

generating an alternating current source driving signal symmetric to the DC common voltage signal to drive a source driver as part of a panel control signal while driving the LCD panel; and sensing with a single sensing layer directly attached above the DC common voltage signal layer, while simultaneously applying the DC common voltage to the DC common voltage signal layer, a touch to output a position signal, wherein the DC common voltage is a DC signal of 0 volts, wherein a protective layer is directly above the sensing layer, and wherein the small-sized panel displays image data by dot inversion while driving the LCD panel.

6. The method according to claim 5, further comprising generating the source driving signal by a plurality of deep N-wells.

7. A touch screen, comprising:

a liquid crystal display (LCD) panel;

a touch panel comprising a single sensing layer, for generating a sensing signal in response to a touch wherein the sensing layer is directly above the LCD panel and directly below a protection layer;

a display controller, for processing an image signal to generate an alternating current source driving signal as part of a panel control signal while driving the LCD panel, the panel control signal comprising a constant common voltage, and for generating a source driving signal with a displacement that is symmetrical to the constant common voltage; and a sensing circuit, coupled to the sensing layer of the touch panel, for receiving the sensing signal to generate a position signal, wherein the constant common voltage is applied by the display controller to the LCD panel via a DC common voltage signal layer, during sensing circuit operation to generate the position signal in response to the touch, to prevent the panel control signal from coupling to the sensing signal, wherein the constant common voltage is a DC voltage of 0 volts, wherein the DC common voltage signal layer is directly attached below the sensing layer, and wherein the LCD panel displays image data by dot inversion while driving the LCD panel.

* * * * *